INVENTOR
ANDREW P. HADJANDREAS

BY
ATTORNEY

AGENT

Nov. 25, 1969         A. P. HADJANDREAS         3,480,866
              FREQUENCY CONTROL SWITCHING SYSTEM
Filed Nov. 29, 1966                            5 Sheets-Sheet 2

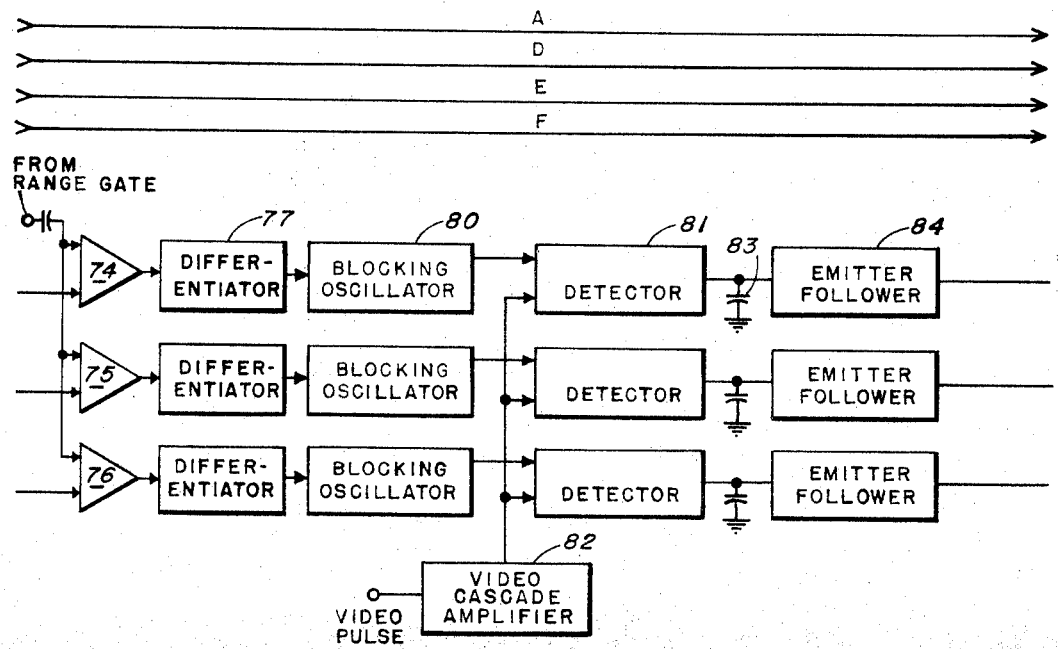
FIG. 3b
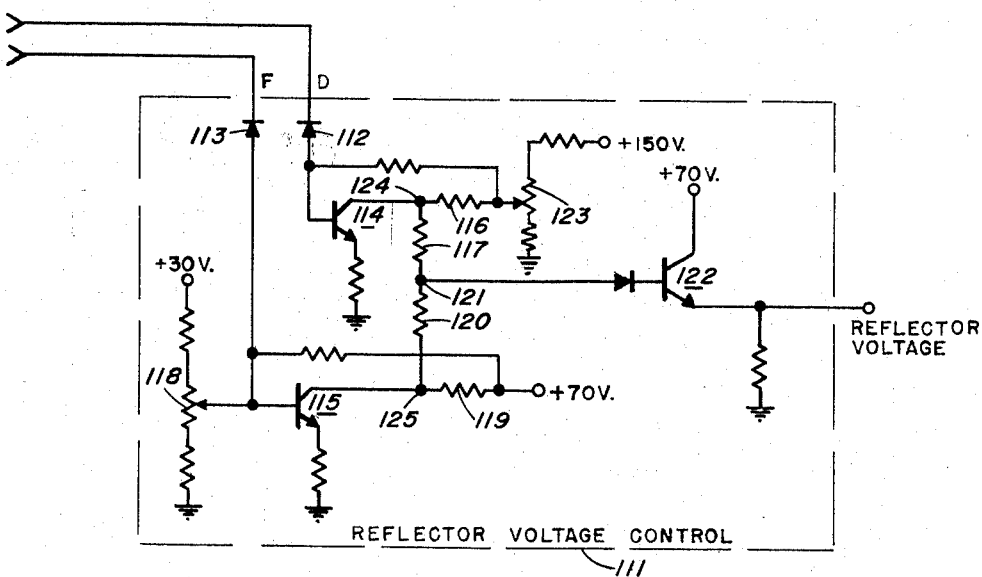
REFLECTOR VOLTAGE CONTROL

Nov. 25, 1969   A. P. HADJANDREAS   3,480,866
FREQUENCY CONTROL SWITCHING SYSTEM
Filed Nov. 29, 1966                                 5 Sheets-Sheet 5

MULTIVIBRATOR COUNT SEQUENCE FOUR

MULTIVIBRATOR COUNT SEQUENCE THREE

ADDER OUTPUT AT JUNCTION 121

OUTPUT OF AND GATES 45, 46 and 44

3,480,866
FREQUENCY CONTROL SWITCHING SYSTEM
Andrew P. Hadjandreas, Plainview, N.Y., assignor, by mesne assignments, to the United States of America as represented by the Secretary of the Navy
Filed Nov. 29, 1966, Ser. No. 597,802
Int. Cl. H04b 1/26
U.S. Cl. 325—423                                7 Claims

ABSTRACT OF THE DISCLOSURE

This invention is directed to an improved frequency control system for a beacon receiver utilized to establish the range and range rate of a guided missile. In the system the local oscillator of the beacon receiver is sequentially moved from one frequency to another and the system sequentially receives signals in three 10-mc. sectors. If the beacon return is received in one of the sectors, the switching is stopped and the A.F.C. equipment is utilized to center the return signal. If the beacon return frequency varies, the A.F.C. will follow the variation for at least 5 mc.

---

The present invention relates to a beacon tracking receiver and more in particular to a frequency control switching system for the beacon klystron local oscillator for automatically acquiring and tracking a beacon signal over a wide frequency range.

In the technique of guiding a missile to a target, various problems arise. A missile could have a variation in its velocity which would produce a flameout if the velocity is too high or would use too much fuel if the velocity is too low. In order to conserve the fuel in the missile, the range rate of the missile has to be programmed to maintain the missile in the proper trajectory to overcome any variation in the velocity of the missile. To program the trajectory of the missile by a radar guidance beam, the range rate of the missile can be determined if the actual range of the missile is known. The missile is equipped with a radar beacon which responds to an RF signal from the guidance transmitter. After the beacon is activated or interrogated by the guidance beam, a beacon signal will be sent back to the tracking station after a predetermined period of time. The actual range to the missile can be determined from the time of transmission of the guidance beam signal to the missile, the time of delay in the response of the beacon and the time of transmission of the beacon signal back to the tracking station. The range and range rate of a missile can readily be calculated as explained above except that the frequency of the beacon signal transmitted from the missile has a a high drift rate due to the particular equipment used. Additional frequency drift of the beam signal is caused by the standing waves on the coaxial line to the beacon transmitting antenna. Because of the shift in the frequency of the beacon signal from the missile, the beacon receiver at the ground or tracking station could either lose the beacon signal or could not accurately determine the range of the missile. Rather than stabilizing the frequency of the beacon signals, the present invention solves the above problem by incorporating in a ground receiver for a beacon signal an improved electronic circuit for stepping the frequency of the local oscillator of the ground receiver so that the narrow IF band pass is maintained for the received beacon signal.

An object of the present invention is to provide a narrow band receiver with greater frequency discrimination.

Another object of the present invention is to provide a high sensitive automatic frequency control loop while searching a wide range of frequencies about the IF frequencies of a receiver.

An object of the present invention is to provide for the tracking of signals which drift in frequency.

Other objects, advantages and novel features of the invention will become apparent from the following detailed description of the invention when considered in conjunction with the accompanying drawings wherein:

FIGS. 3a through 3c are a combination of a schematic and block diagram of a frequency controlled switching system of the present invention;

Figure 1:
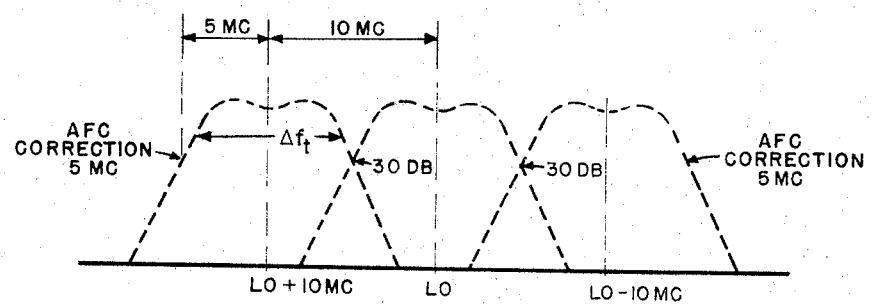
FIG. 1 shows the overall response of the IF amplifier of a receiver at three different local oscillator frequencies during acquisition to illustrate the principles of stepping the frequency local oscillator.

Referring now to the drawings, the basic principles of stepping the frequency of the local oscillator into three discrete frequencies is diagrammed in FIG. 1. When the local oscillator of the beacon receiver is sequentially moved from one frequency to another, the beacon receiver is able to receive signals in three 10 megacycle sectors. When the beacon signal from a missile is received in one of the frequency sectors, that sector will be chosen and the switching from one frequency sector to another will be stopped. The automatic frequency control discriminator will then tend to center the received beacon signal within the IF bandpass of the receiver. If the beacon signal varies in frequency, the automatic frequency control discriminator will then follow the variation for at least 5 megacycles. From FIG. 1, the receiver system will continue to lock on a beacon signal so long as it remains within 15 megacycles of the received sector frequency center or the middle frequency of the local oscillator. If the beacon signal should fade out or the beacon in the missile should have a failure, the receiver will still remain at the predetermined local oscillator frequency before such fade-out by the utilization of a lock-on circuit.

Figure 2:
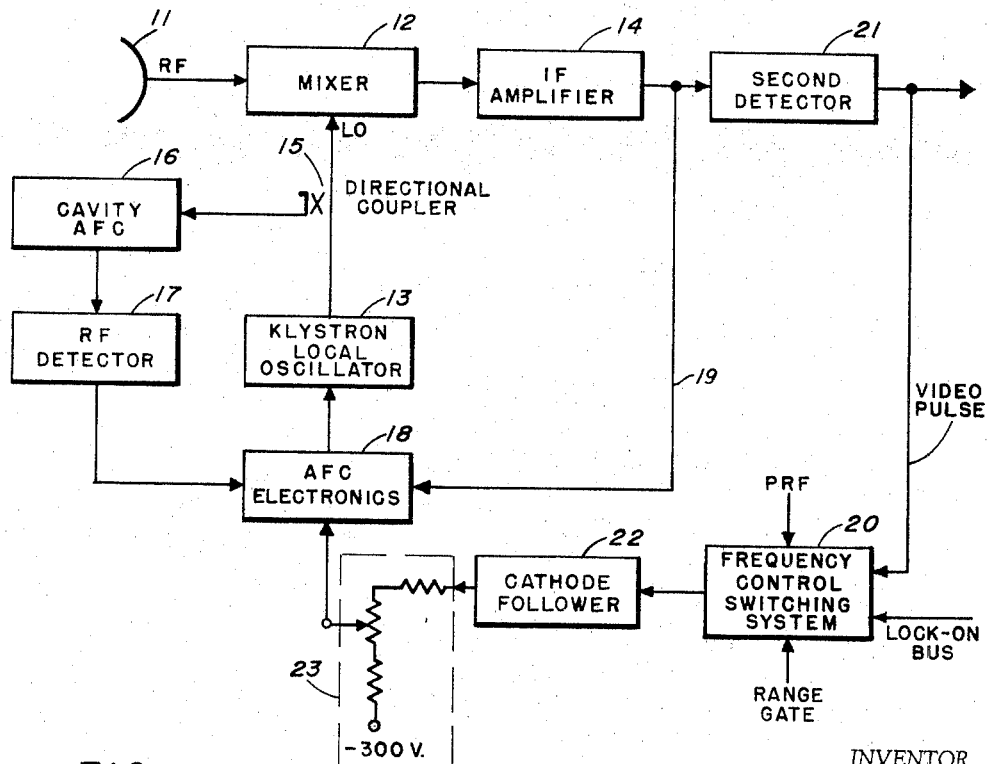
FIG. 2 is a block diagram of the automatic frequency control circuits of a beacon receiver.

The environment in which the present invention is used is shown by FIG. 2 wherein the radio frequency signal or beacon signal from the beacon in the missile received on the antenna 11 is fed to mixer 12 where the RF signal is mixed with the local oscillator frequency signal from the klystron local oscillator 13 to produce the intermediate frequency signal for the IF amplifier 14. Part of the local oscillator signal is extracted by the directional coupler 15 and fed to cavity 16 to resonate such energy from the directional coupler 15. The radio frequency detector 17 then analyzes the frequency of the cavity and feeds a correction voltage to the automatic frequency control electronics 18 to adjust the frequency of the local oscillator 13 as a coarse frequency control to maintain the detection of the beacon signal within the 30 megacycle range of the receiver. The coarse frequency control by the coupler cavity 15 and RF detector 17 adjusts the oscillator 13 to compensate for instability in the receiver as well as in the beacon. When a beacon signal is received and mixed in mixer 12 to give an IF signal from IF amplifier 14 part of this IF signal is fed on lead line 19 to the automatic frequency control electronics 18 for detecting the frequency of the IF signal by a discriminator in the AFC electronics 18 which develops a voltage for the reflector of klystron local oscillator 13 to maintain the local oscillator at a frequency to center the beacon signal within the receiver IF bandpass. If the beacon signal varies in frequency, the discriminator of AFC electronics 18 will follow such variation for at least 5 megacycles.

The frequency control switching system of the present invention is incorporated into the beacon receiver after second detector 21 which is connected to the IF amplifier 14 and between the AFC electronics 18 and varies the klystron frequency in three discrete frequency sectors by stepping the voltage level applied to the reflector of the klystron local oscillator through AFC electronics without affecting the automatic frequency control thereof.

A particular step voltage for one of the three different frequency sectors is maintained by the frequency control switching system 20 when the video pulse from detector 21 is in time coincidence with the range gate and a particular sequential time period. This step voltage from system 20 is fed through the cathode follower 22 and the manual frequency control input circuit 23 to the automatic frequency control electronics 18, which adds this voltage step to existing automatic frequency control correction. The automatic frequency corrector could be derived from the cavity AFC or the feedback of IF beacon signal on lead line 19.

Figure 3A:
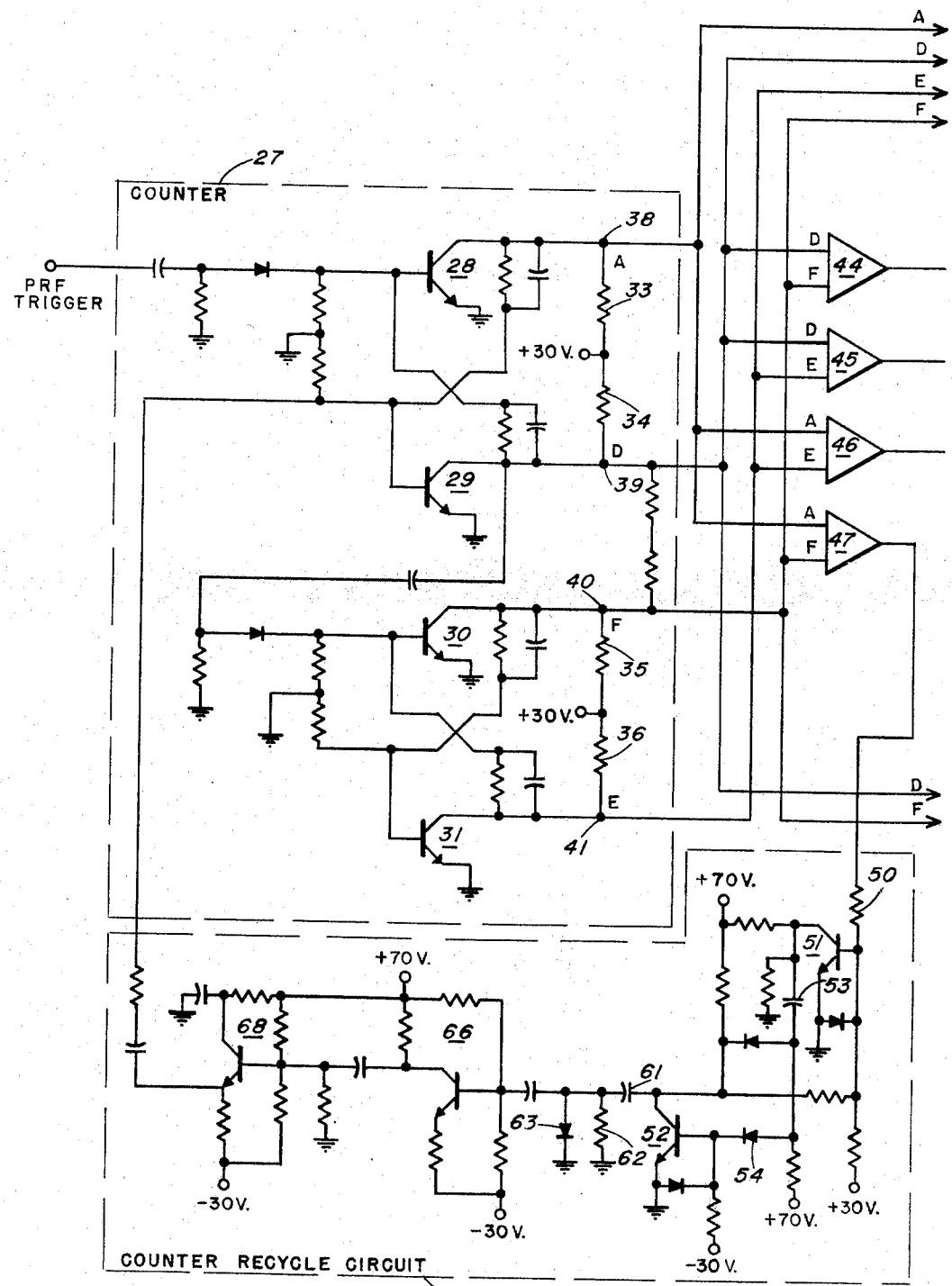
Figure 3C:
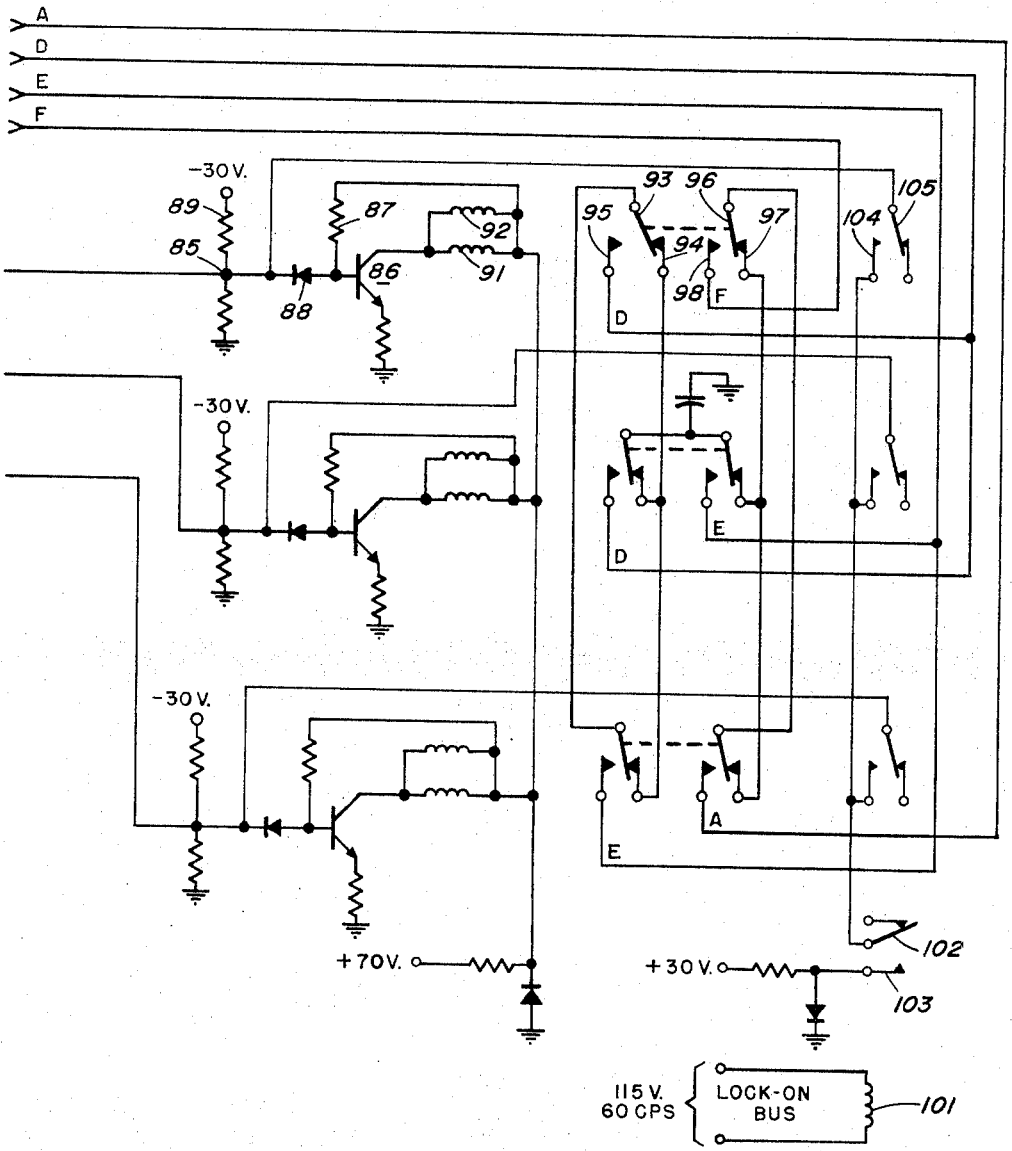

Referring now to FIGS. 3a, 3b and 3c, the frequency control switching system 20 is shown as a combined schematic and block diagram having the arrangement of electronic elements which sequentially step the klystron local oscillator frequency by plus or minus 10 megacycles during the acquisition mode of the receiver. When the beacon signal from the missile is received and is in coincidence with the range gate, the electronic elements operate on various relays to select the frequency sector where the beacon video exists. Once the beacon video is received in a certain frequency sector the sequential stepping of the local oscillator will be stopped at this particular sector.

Figure 4A:
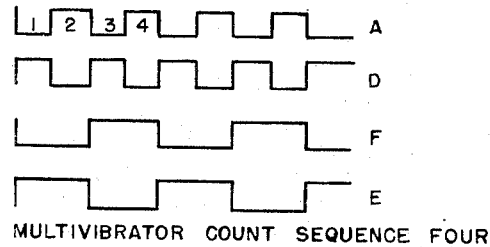
FIGS. 4a through 4e show diagrams of the voltage output wave forms for parts of the schematic of FIG. 3.

In FIG. 3a, the frequency control switching system 20 has a counter 27 for establishing the sequential time periods or look see periods of the receiver for the three different frequency sectors of the local oscillator. This counter 27 comprises two bi-stable multivibrators having transistors 28, 29, 30, and 31 and biasing resistors 33, 34, 35 and 36 of such value that the output wave forms at the collectors of the transistors as represented in FIG. 4a by A, D, F and E appear, respectively, at junctions 38, 39, 40 and 41 if the multivibrator is permitted to count to a sequence of four. The counter is initiated by the pulse repetition frequency trigger which occurs approximately in coincidence with the transmittal signal of the guidance beam from the tracking station. Each of the collector outputs of the transistors of the multivibrators A, D, F and E are fed to one or more inputs of four AND gates 44, 45, 46 and 47. When the fourth count of the multivibrator counter is reached as indicated in FIG. 4a, both outputs or gate signals A and F are positive and would activate AND gate 47 to provide a positive voltage to counter recycle circuit 49. Resistor 50 prevents the base of transistor 51 from loading the AND gate 47. The application of the positive voltage or pulse from gate 47 to resistor 50 causes transistor 51 to conduct. Since transistor 51 in combination with transistor 52 form a single shot multivibrator, transistor 52 is off or non-conducting while transistor 51 conducts. The negative feedback from the collector of transistor 51 is fed through capacitor 53 to keep the base biasing voltage from the base of transistor 52 or to maintain transistor 52 off for the duration of the pulse applied from gate 47 to transistor 51. The pulse output from transistor 52 of the one-shot multivibrator is fed to a differentiator composed of capacitor 61 and resistor 62. The positive part of the differentiated signal from the differentiators 61 and 62 is clipped by diode 63 while the negative part is amplified by the following transistor stage 66. The amplified negative signal from the transistor stage 66 is fed through an emitter follower 68. The negative output pulse from stage 68 is coupled back to the counter 27 to the base of transistor 29 to cut off transistor 29 and initiate the activation or conduction of transistor 28. This negative feedback pulse from the counter re-cycle circuit 49 acts the same as the PRF trigger and advances the counter 27.

Figure 4B:
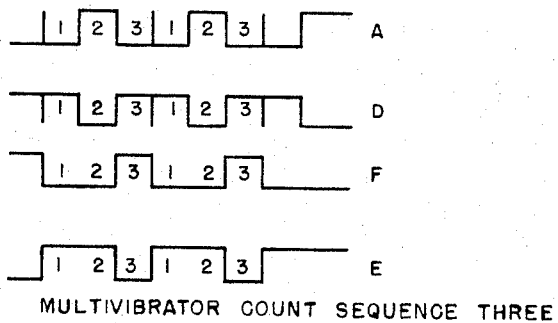

In other words, the counting cycle starts all over again eliminating the fourth count of transistor stage 28 of counter 27. By action of the counter 27 starting again, the positive signal applied from gate 47 to the counter recycle circuit 49 is eliminated. The recycling or restoring of the counter circuit 27 to its original condition takes about 10 microseconds. Thus the counter 27 establishes an iterated count of three after first being initiated by a PRF trigger. The output waveforms A, D, F and E at junctions 38, 39, 40 and 41 for a sequence of three are shown by FIG. 4b.

Figure 4C:
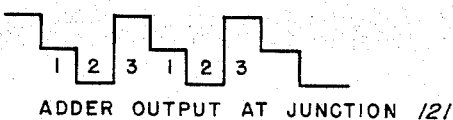
Figure 4D:
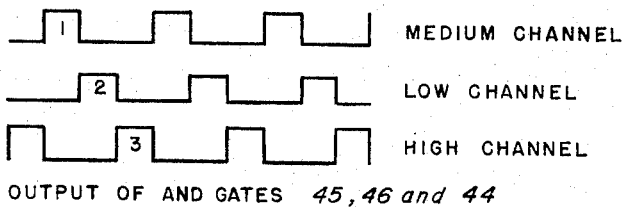

The collector output signals A, D, F and E of the counter multivibrators are fed to one or more inputs of the AND gates 44, 45 and 46. The D and F signals are applied to gate 44, the D and E signals are applied to gate 45 and the A and E signals are applied to gate 46 such that the net results from gates 44, 45 and 46 produce sequentially positive outputs over a three-repetition rate period as indicated in FIG. 4d. The sequential output from gates 44, 45 and 46 are applied respectively to a second series of AND gates 74, 75 and 76 in FIG. 3b, which constitute the beginning of three distinct frequency channels for reception of either high, medium or low frequency of the beacon radar video. Each channel comprises after the second AND gate a differentiator, a blocking oscillator, a staircase detector, storage capacitor, high input impedance emitter follower and relay circuit. Each of these channels constitute a boxcar detector for coupling and storing instantaneous video pulses. Since the elements of each channel are identical, only one channel will be explained in detail.

The input to second AND gate 74 is the sequential output pulse from gate 44 and the positive range gate. When the two inputs to gate 74 are coincident, a positive output will then be applied to differentiator 77 and fed into a blocking oscillator 80. The output from the blocking oscillator 80 is applied to a detector 81 to trigger the detector for the time period of the range gate. The other input to the detector is the amplified radar video from cascade amplifier 82 part of second detector 21. Any video of the beacon signal present during the range gate and one of the three sequential time periods coming from gates 74, 75 or 76 as determined by the counter 27 during which a detector is activated will be fed to one of the storage capacitors 83. The capacitor 83 is connected to an emitter follower 84 of the Darlington configuration. Storage capacitor 85 acts to accumulate the video pulses present during the time the detector 81 is operating so that any increase in voltage on capacitor 83 will increase the voltage at junction 85 in FIG. 3c after the emitter follower 84. The actuating relay transistor 86 whose base follows the voltage on junction point 85 is normally cut off because of the bias circuits for the base from the plus 70 volts supply through resistor 87 diode 88 to junction point 85. When the voltage at junction point 85 increases, the transistor 85 conducts since the diode 88 is cut off by being back biased which allows for the increase of the biasing on the base activating the collector current of transistor 86 through relay coils 91 and 92. Relay coil 91 actuates moving contacts 95 between fixed contacts 94 and 95 and moving contact 96 between fixed contacts 97 and 98 to connect the collectors of transistors 29 and 30 together of counter 27 thereby disabling the counter and maintaining the output voltage as represented by FIG. 4b to the gate 44 of the described channel. The actuation of contacts 93 and 96 effectively grounds the D and F gate signal from the multivibrator counter 27.

A lock-on bus is provided to maintain the selected channel if the video signal to transistor 86 fails during the particular time sequential gate of that channel. The lock-on bus is generated in the receiver when the receiver locks on a beacon signal. The 115 volts 60 cycle locked-on bus energizes relay coil 101 to actuate moving contact 102 to connect the 30 volts at fixed contact 103 through contact 104 and movable contact 105 operated by relay coil 92 to the cathode of diode 88. Since relay 92 actuates movable contact 105 the voltage applied to the cathode of diode 88 actuated by the lock-on bus is sufficient to keep transistor 86 conducting if the video radar signal fails. However, when the receiver returns to acquisition mode searching for a beacon signal the lock-on bus is removed from relay coil 101.

At the same time that counter 27 is applying outputs A, D, F and E to gates 44, 45, 46 and 47 to establish the repeated sequential time periods after a PRF trigger, the output D and F as represented in FIG. 4b from collectors of transistor 29 and 30 of the counter 27 are fed to a reflector voltage control circuit 111, as shown in FIG. 3b, which determines a different level or value of voltage applied through the manual frequency control 23 to the A.F.C. electronics 18 to the reflector of the klystron local oscillator to change the frequency thereof. Referring now to FIGS. 4b and 4d during the first count of counter 27 as indicated by 1 in FIG. 4b; output waveform D and E are applied to AND gate 45 to select that particular channel starting with AND gate 75 during the first sequential time period. During this same sequential time period, the voltage level at collectors of transistors 29 and 30 represented by D and F in FIG. 4b are applied to the reflector voltage control circuit 111 as indicated in FIG. 3b At this time the D signal is positive and the F signal is negative from the counter 27 so that diode 112 is back biased and diode 113 is forwarded biased. When diode 112 is back biased no current flows through it and the biasing circuit for transistor 114 functions to cause transistor 114 to conduct which forces the potential at the collector toward zero volts. As a consequence the voltage at the junction 124 of resistors 116 and 117 is close to zero. With diode 113 forward biased upon the application of a negative voltage to the cathode of diode 113, current flows from potentiometer 118 through the diode 113 causing the base of transistor 115 to be at a low voltage thereby cutting off transistor 115 which raises the voltage of the collector of transistor 115 resulting in the voltage at the junction 125 between resistors 119 and 120 being at about 70 volts positive. Resistors 117 and 120 comprise the adder circuit of the reflector voltage control 111. Under the conditions when D is positive and F is negative the output voltage at the junction 121 assumes a value between 0 and 70 volts which is DC coupled to emitter follower 122 and is subsequently fed to cathode follower 22 affecting the voltage applied to the reflector of the klystron local oscillator 13. This voltage level between 0 and 70 developed by reflector voltage control 111 at the adder output 124 causes the local oscillator to operate at a medium frequency. The particular voltage value at junction 124 is independent of the settings of potentiometer 123 and 118 since transistor 114 is fully on and its collector will remain at ground potential regardless of the value of the collector voltage supply as determined by potentiometer 123 and simultaneously transistor 115 is held in cutoff state by diode 113 regardless of the position of potentiometer 118.

During the time that the multivibrator or counter 27 develops the sequential second period or low channel period by applying the A and E signals to gate of 46 and negative D and F signals to reflector voltage control, the diodes 112 and 113 will be forward biased which causes both the transistors 114 and 115 to be cut off. The inaction of transistor 114 raises the voltage at collector of transistor 114 or junction 124 to a value determined by the potentiometer 123. With transistor 115 cut off, the junction 125 between resistors 119 and 120 as previously determined is approximately 70 volts. Thus with transistor 114 cut off the voltage from the adder circuit 121 is higher which causes the local oscillator frequency to decrease from the application of an increase in voltage level to the reflector of the klystron local oscillator.

Referring again to FIGS. 4b and 4d when the third sequential time period designated by 3 in FIGS. 4b and 4d is developed by the counter 27 by applying signals E and F to a gate 44, the signals D and F are both positive which causes the diodes 112 and 113 in the reflector voltage control 111 to be both back biased and biasing circuits of transistors 111 and 115 to be active causing both transistors 114 and 115 to conduct forcing the potential at each collector thereof to zero. Since the voltage on collectors of transistors 114 and 115 is approximately zero volts or ground potential, the voltage of the adder output junction 121 between resistors 117 and 120 is depressed. This lower voltage coupled through transistor emitter follower stage 122 through the cathode follower 22 to the klystron oscillator causes the frequency of the klystron local oscillator to be above or higher than that for the medium channel and would establish a high frequency for the channel selected by AND gate 44. The adder output at the junction 121 between resistances 117 and 120 is shown by FIG. 4c during the acquisition mode of the receiver which indicates the three different voltage levels applied to the klystron local oscillator successively according to the sequential counts of the counter 27.

Figure 4E:
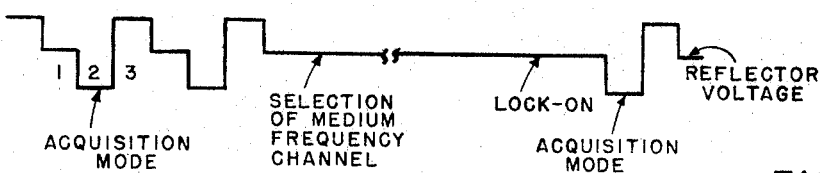

Referring now to FIG. 4e, the variation in the voltage applied to the reflector as a result of the present invention of a frequency control switching system is shown where during acquisition mode the voltage level to the reflector switches between three values and once video signals are received in a particular channel that channel is selected. In FIG. 4e the selection and lock-on of the medium channel is shown. For example, once the video signal is lost by the receiver, the lock-on bus is removed and the frequency switching control system returns to the acquisition mode which reinstates the sequential channel and voltage level switching of the klystron local oscillator.

Obviously many modifications and variations of the present invention are possible in the light of the above teachings. It is therefore to be understood that within the scope of the appended claims the invention may be practiced otherwise than as specifically described.

What is claimed is:

1. In a beacon receiver, a frequency control switching system for a klystron local oscillator comprising
    counting means having an external trigger pulse applied thereto for initiating said counting means, said counting means establishing a series of related output signals repeating after a particular count;
    gate means connected to said counting means, said related output signals of said counting means being applied to said gate means, said gate means producing a series of sequential signals repeating after a particular count;
    a plurality of channel means connected to said gate means, a range gate signal being applied to said plurality of channel means, each of said sequential signals from said gate means being applied respectively to one of said channel means, beacon video being applied to said plurality of channel means, each of said channel means sequentially sampling the presence of said video during sampled time coincidence of said range gate signal and one of said sequential signals and storing said video during said sampled time coincidence, one of said channel means indicating the presence of said video by the accumulation of said stored video during said sampled time coincidence and causing said counting means to stop counting for maintaining said one of said means operative for said sampled time coincidence;
    control means connected to said counting means receiving said related output signals for indicating a sequence of voltage steps in coincidence with said series of sequential signals of said gate means for changing in sequence the frequency of a local oscillator to follow the variation in frequency of beacon video by frequency steps of the local oscillator in the acquisition mode and to maintain a particular voltage step for a particular frequency of the local oscillator during said operative one of said channel means.

2. The frequency control switching system of claim 1 comprising
recycling means connected between said gate means and said counting means for developing a feedback pulse to recycle said counting means after a particular count.

3. The frequency control switching system of claim 1 comprising
lock-on means connected to said channel means for maintaining the activation of one of said channel means during the temporary loss of said video.

4. The frequency control switching system of claim 1 wherein said control means comprises two switch means, two voltage determining means, and means connected to said two voltage determining means, said two voltage means being connected respectively to said two switch means, said two switch means receiving respectively a pair of related outputs signals from said counting means for actuating said voltage determining means for establishing voltage steps at the output of said adder means depending upon the values of said related outputs, said voltage steps of said adder means for applying to a local oscillator for stepping the frequency thereof.

5. The frequency control switching system of claim 4 wherein each of said channel means comprises
and AND gate connected to said gate means, said AND gate receiving one of said sequential signals and said range gate signal developing a positive output when said one of said sequential signals and said range gate signals are coincident;
a blocking oscillator being connected to said AND gate;
a detector connected to said blocking oscillator, said positive output of said AND gate activating said blocking oscillator whereby said blocking oscillator triggers said detector for the period of the range gate signal, said beacon video being applied to each detector of said channel means;
video storage means connected to said detector, said video storage means storing said beacon video during said sampled time coincidence,
monitoring means connected to said storage means; and
relay operating means connected to said monitoring means, said detector sampling the presence of said video during the time coincidence of said range gate signal and said one of said sequential signals, said monitoring means transferring a voltage representing said stored video to said relay operating means, said relay operating means being actuated by a particular voltage level of said stored video and causing said counting means to stop counting and maintaining said one of said channel means active.

6. The frequency control switching system of claim 5 wherein said counting means comprises two bistable multivibrators establishing said series of related output signals, said output signals including two sets of count signals, each set of count signals having signals the inverse of the other alternating between positive and negative pulses, one set of count signals having a particular counting period, the other set having twice the counting period, said related output signals being applied to said gate means in pairs of said count signals, said pairs consisting of count signals from each of said sets, for producing a series of sequential signals from said gate means.

7. The frequency control switching system of claim 6 wherein said relay operating means include lock-on means for receiving a lock-on signal for maintaining said particular voltage level for maintaining said one of said channel means active during the temporary loss of said video at said detector.

References Cited

UNITED STATES PATENTS

| 2,951,150 | 8/1960 | Rennenkampf | 325—322 |
| 2,798,946 | 7/1957 | Howery | 325—321 |

KATHLEEN H. CLAFFY, Primary Examiner

D. L. RAY, Assistant Examiner

U.S. Cl. X.R.

331—7, 9